US006844892B2

(12) United States Patent
Iima et al.

(10) Patent No.: US 6,844,892 B2
(45) Date of Patent: Jan. 18, 2005

(54) MULTI-BEAM SCANNING DEVICE

(75) Inventors: Mitsunori Iima, Saitama-ken (JP); Toshimitsu Saito, Saitama-ken (JP); Tadashi Minakuchi, Saitama-ken (JP); Shoji Iwazaki, Tokyo (JP)

(73) Assignee: PENTAX Corporation, Tokyo (JP)

(*) Notice: Subject to any disclaimer, the term of this patent is extended or adjusted under 35 U.S.C. 154(b) by 29 days.

(21) Appl. No.: 10/459,432

(22) Filed: Jun. 12, 2003

(65) Prior Publication Data

US 2004/0008248 A1 Jan. 15, 2004

(30) Foreign Application Priority Data

Jun. 13, 2002 (JP) ....................................... 2002-172414

(51) Int. Cl.[7] .......................... G02B 26/08; G02B 26/10

(52) U.S. Cl. ....................................... 347/243; 347/259

(58) Field of Search ................................ 347/243, 258, 347/259, 260, 261; 359/204, 207, 211, 212, 216

(56) References Cited

U.S. PATENT DOCUMENTS 5,812,299 A * 9/1998 Minakuchi et al. ......... 359/216
5,838,001 A 11/1998 Minakuchi et al.

* cited by examiner

*Primary Examiner*—Huan Tran
(74) *Attorney, Agent, or Firm*—Greenblum & Bernstein, P.L.C.

(57) ABSTRACT

A multi-beam scanning device includes a light source for emitting a plurality of laser beams, a polygon mirror for deflecting the laser beams so that the laser beams scan across an object surface in a main scanning direction, an fθ lens disposed between the polygon mirror and the object surface, and a cylindrical lens that converges each laser beam in a vicinity of the polygon mirror in the auxiliary direction. A mirror is disposed between the light source and the cylindrical lens which deflects the laser beams in the auxiliary scanning direction. The mirror is rotatably supported by a mirror holder such that the traveling direction of the laser beams deflected by the mirror can be adjusted.

11 Claims, 8 Drawing Sheets

MULTI-BEAM SCANNING DEVICE

BACKGROUND OF THE INVENTION

The present invention relates to a multi-beam scanning device that is to be utilized in a laser beam printer, a laser photo-plotter, or the like. In the multi-beam scanning device, a plurality of laser beams are deflected by a rotating polygonal mirror and passed through an fθ lens system. Each laser beam passed through the fθ lens converges in a vicinity of an object surface, such as a surface of a photo-sensitive drum or a photo-surface of a printed circuit board, to form a spot that scans the object surface in a main scanning direction at a constant scanning rate. The object surface is moved at a constant speed in a direction perpendicular to the main scanning direction, or an auxiliary scanning direction, so that a plurality of scanning lines are formed on the object surface. The laser beams are scanned across the object surface while being modulated on/off in accordance with an image information to form a two dimensional image on the object surface.

Typically, in order to correct the so-called tilting error (facet error) of the polygon mirror, the fθ lens has a power in the auxiliary scanning direction that makes the reflecting surface of the polygon mirror to be optically conjugate to the object surface. Further, a cylindrical lens is provided between the laser source and the polygon mirror so that each laser beam is converged in the auxiliary scanning direction near the polygon mirror.

Some multi-beam scanning devices are provided with an additional deflector for moving in parallel the laser beams traveling toward the polygon mirror. The additional deflector controls the positions of the laser beams in auxiliary direction so that the scanning lines are formed on the object surface at a constant interval even if the moving speed of the object surface in the auxiliary scanning direction varies.

It should be noted that if the fθ lens system is designed to correct the tilting error of the polygon mirror, the focal length of the fθ lens in the auxiliary scanning direction is relatively short, resulting in a large field curvature, or Petzval curvature, in the auxiliary scanning direction. Thus, if the additional deflector shifts the laser beam for a large distance in the auxiliary direction, the beam waist will be largely displaced from the object surface and the spot formed on the object surface becomes to have a size exceeding an acceptable size range. Therefore, the additional deflector is typically designed to move the laser beams only in a vicinity of the optical axis of the fθ lens.

If one of the lens in the optical system of the multi-beam scanning device is decentered due to a manufacturing error or inclined due to an assembling error, the image plane of the optical system, which has large field curvature in the auxiliary direction, inclines against the object surface. The inclination of the image plane may occur such that the image plane on one side, or first side, of the optical axis in the auxiliary scanning direction displaces more than on the other side, or second side.

The inclination of the image plane described above increases, on the first side of the optical axis, the displacements of the beam waist positions caused by the additional deflector shifting the laser beams in a direction from the second side of the optical axis to the first side. The increase of the displacement becomes larger with the distance of the laser beams from the optical axis. Thus, the displacement of the beam waist position of the laser beam most apart from the optical axis becomes extremely large when the additional deflector fully shifts the laser beams. As a result, the size of the spot formed on the object surface by the laser beam most apart from the optical axis becomes much larger than that formed by the laser beam on the second side or near the optical axis. This causes an unacceptable size difference among the spots formed on the object surface, which deteriorates the imaging quality of the multi-beam scanning device.

The inclination of the image plane, and hence the size of the spot formed on the object surface, can be corrected by reshaping the decentered lens or reassembling the optical system. Such methods, however, require much labor hour, which decreases the production efficiency of the multi-beam scanning device.

Therefore, there is a need for a multi-beam scanning device that is capable of preventing an unacceptable size difference among the spots formed on the object surface caused by the manufacturing and/or assembling error of the lens in the optical system without requiring reshaping the lens or reassembling the optical system.

Generally, the multi-beam scanning device requires adjustment of the optical system thereof so that the laser beams are converged in a vicinity of the object surface in both the main scanning direction and the auxiliary scanning direction. Such adjustment is carried out by moving two lenses in the optical axis direction. The first one is a rotationally symmetrical collimator lens provided for converting a divergent light beam emitted from a laser source into a parallel light beam. The second one is the cylindrical lens provided for correcting the tilting error of the reflecting surface of the polygon mirror. The collimator lens is moved to adjust the position at which the laser beam is converged in the main scanning direction, while the cylindrical lens is moved to adjust the position at which the laser beam is converged in the auxiliary scanning direction.

However, if the collimator lens is moved, the light beam entering the additional deflector, which is placed between the collimator lens and the cylindrical lens, becomes a divergent or converging light. If the additional deflector is operated in such a condition, the image plane position displaces in the optical axis direction and the sizes of the spots formed on the object surface change. The displacement of the image plane, and hence the change in spot size, increases as the additional deflector increases the laser beam shifting distance. Since the additional deflector changes the laser beam shifting distance in accordance with the variation of the moving rate of the object surface, the size of the spots formed on the object surface also changes in accordance with the moving rate of the object surface, which causes deterioration of the imaging quality of the multi-beam scanning device.

Therefore, there is a need for a multi-beam scanning device that is capable of adjusting the converged positions of the laser beams in each of the main scanning direction and the auxiliary scanning direction while avoiding the laser beam entering the additional deflector becoming a diverging or converging light.

SUMMARY OF THE INVENTION

The present invention is advantageous in that a multi-beam scanning device is provided that satisfies the needs mentioned above.

According to an aspect of the invention, there is provided a multi-beam scanning device including a light source having a plurality of light emitting elements arranged in a line to emit a plurality of laser beams, and a main deflector having a reflecting surface that deflects the laser beams so that the laser beams scan across an, object surface in a main scanning direction. The object surface is moved in an auxiliary scanning direction which is perpendicular to the main scanning direction. An image forming optical system is disposed between the main deflector and the object surface so that the reflecting surface of the main deflector is optically conjugated to the object surface in the auxiliary scanning direction. A cylindrical lens group is disposed between the light source and the main deflector. The cylindrical lens group converges, in the auxiliary scanning direction, each of the laser beams in a vicinity of the reflecting surface of the main deflector. A deflecting element is disposed between the light source and the cylindrical lens group. The deflecting element deflects the laser beams in the auxiliary scanning direction. An deflecting element supporting mechanism movably supports the deflecting element so as to allow adjustment of the traveling direction of the laser beams deflected by the deflecting element.

In the multi-beam scanning device arranged as described above, the inclination of the image plane against the object surface due to the decentering of the optical elements due to manufacturing error and/or assembling error can be corrected by adjusting the direction into which the deflecting element deflects the laser beams. Thus, the size variation of the spots formed on the object surface due to decentering of the optical elements can be reduced.

Optionally, the multi-beam scanning device may include an additional deflector disposed between the deflecting element and the cylindrical lens group, which moves the laser beams in parallel in the auxiliary scanning direction in accordance with a moving speed variation of the object surface in the auxiliary scanning direction.

Optionally, the deflecting element is a half mirror that allows a part of each laser beam passing therethrough. In this case, the multi-beam scanning device may further have an optical sensor for detecting light intensity of each of the laser beams passed through the half mirror.

According to another aspect of the invention, a beam scanning device is provided that includes a light source that emits a light beam and an optical system arranged between the light source and an object surface to converge the light beam in a vicinity of the object surface. The optical system includes a main deflector and an additional deflector.

The main deflector deflects the light beam so that the light beam scans the object surface in a main scanning direction while the object surface is moved in an auxiliary scanning direction, which is perpendicular to the main scanning direction.

The additional deflector is disposed on the optical axis of the optical system between the light source and the main deflector. The additional deflector shifts the light beam in parallel in the auxiliary direction in accordance with a moving speed variation of the object surface.

The optical system further includes first and second lenses disposed between the light source and the additional deflector. Each of the first and second lenses is movable in an optical axis direction of the optical system. By moving in the optical axis direction, the first and second lenses adjust first and second beam converging positions at which the light beam is converged by the optical system in the main and auxiliary scanning directions, respectively. The ratio between the moving distances of the first and second beam converging positions caused by the movement of the first lens being different from that caused by the movement of the second lens.

In particular cases, the first and second lens are rotationally symmetrical lenses. In this case, the optical system further includes an anamorphic optical element, such as an anamorphic prism, disposed between the first and second lenses. The anamorphic optical element deforms the shape of the laser beam passed therethrough only in the auxiliary scanning direction.

More specifically, the first lens may be a collimator lens disposed between the light source and the anamorphic optical element, which converts the laser beam emitted from the light source into a parallel light. The second lens may be one lens of a relay lens system disposed between the anamorphic optical element and the additional deflector.

BRIEF DESCRIPTION OF THE ACCOMPANYING DRAWINGS

FIG. 1 schematically shows a plan view of a multi-beams scanning device according to an embodiment of the invention;

Figure 1:
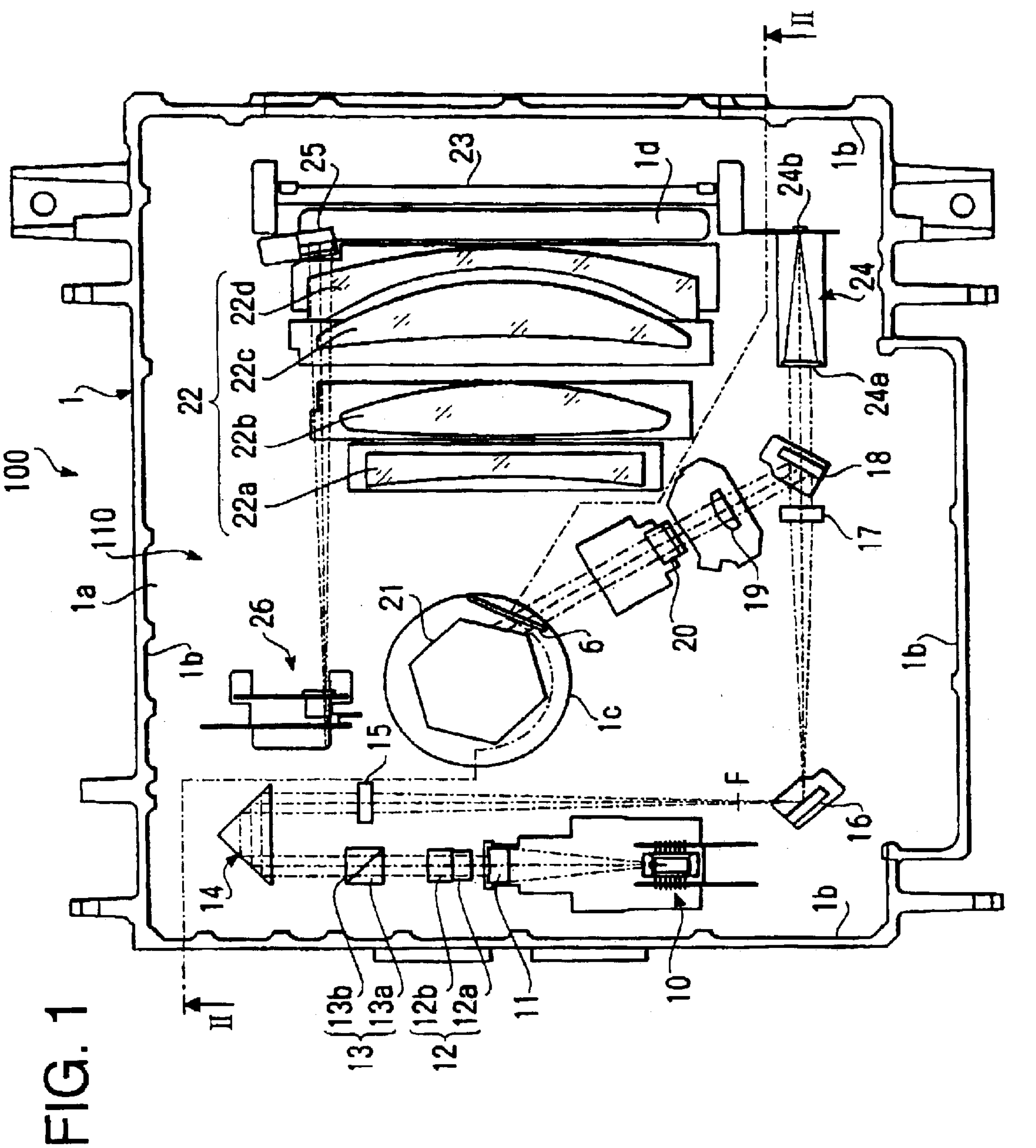
Figure 6A:
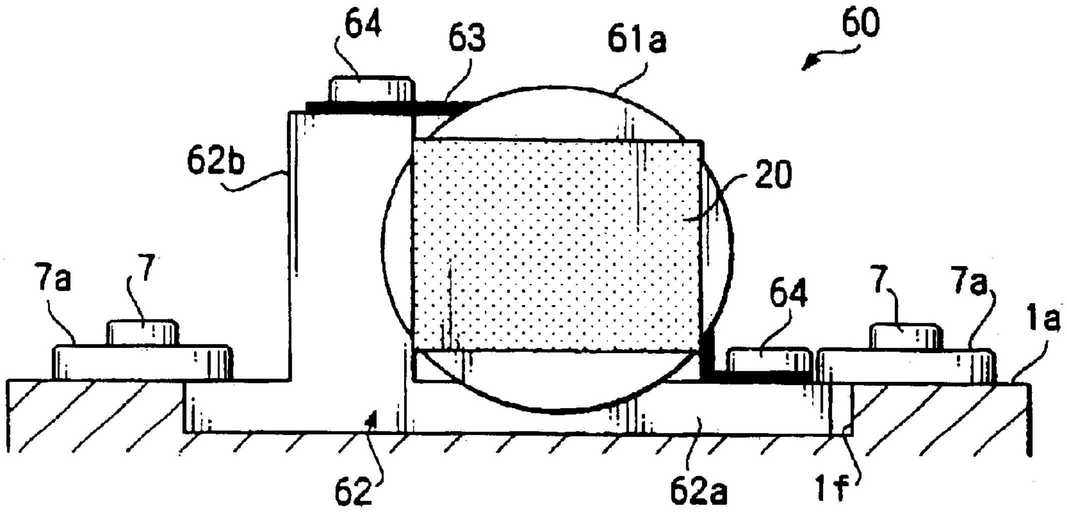
Figure 6B:
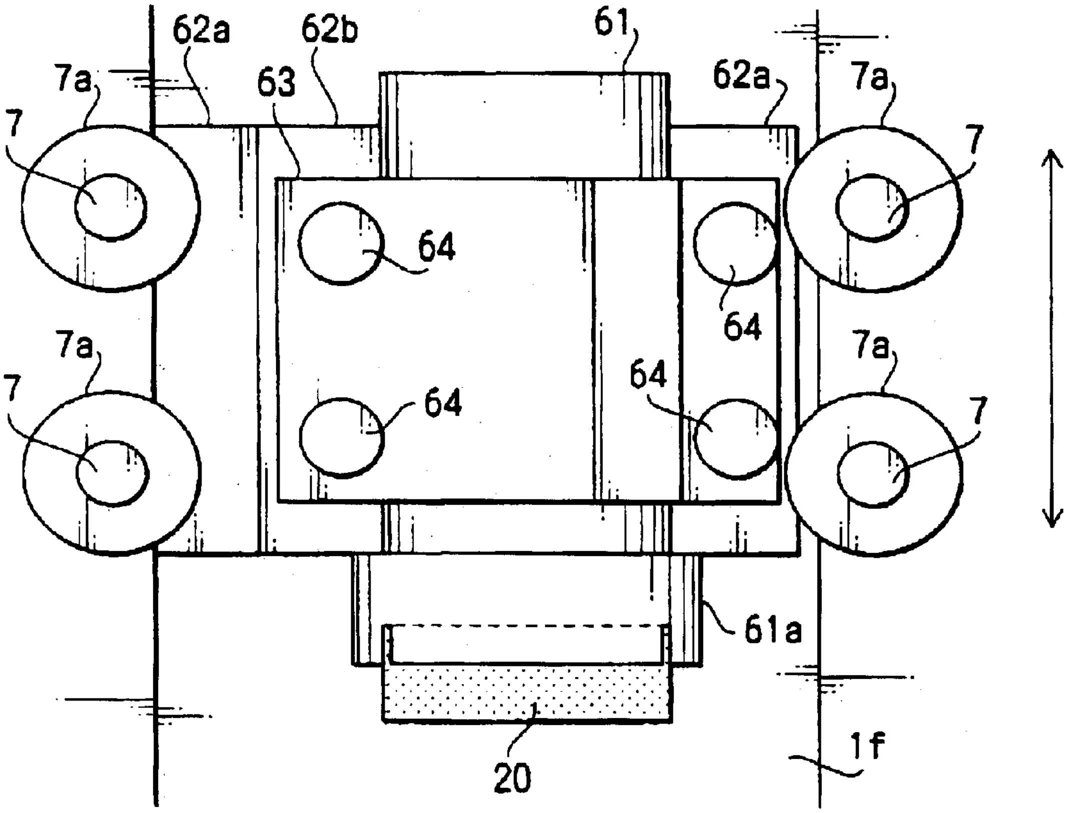
Figure 7A:
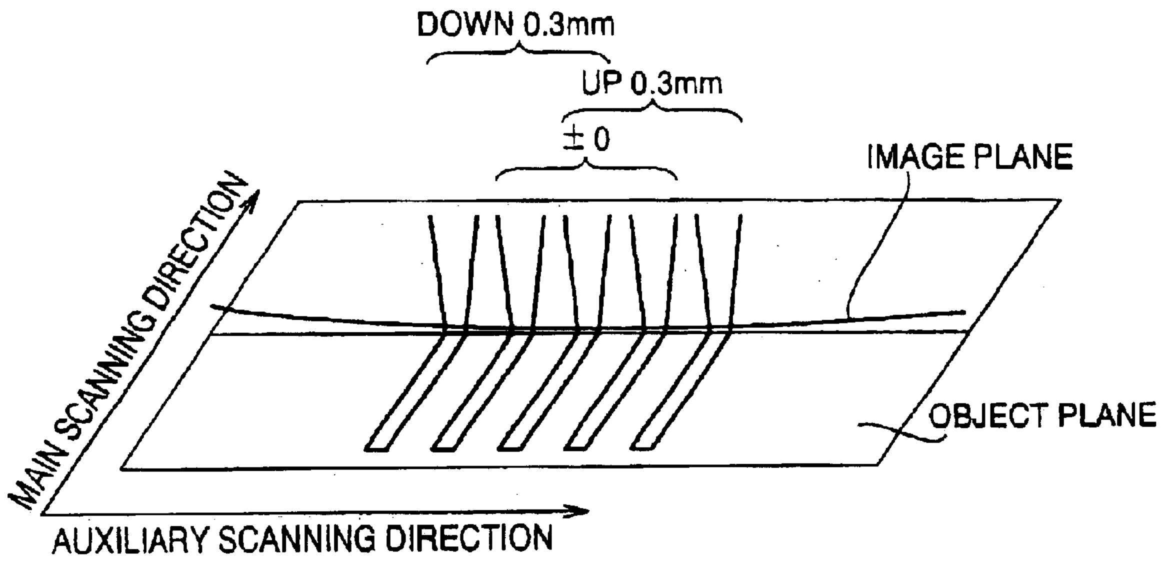
Figure 7B:
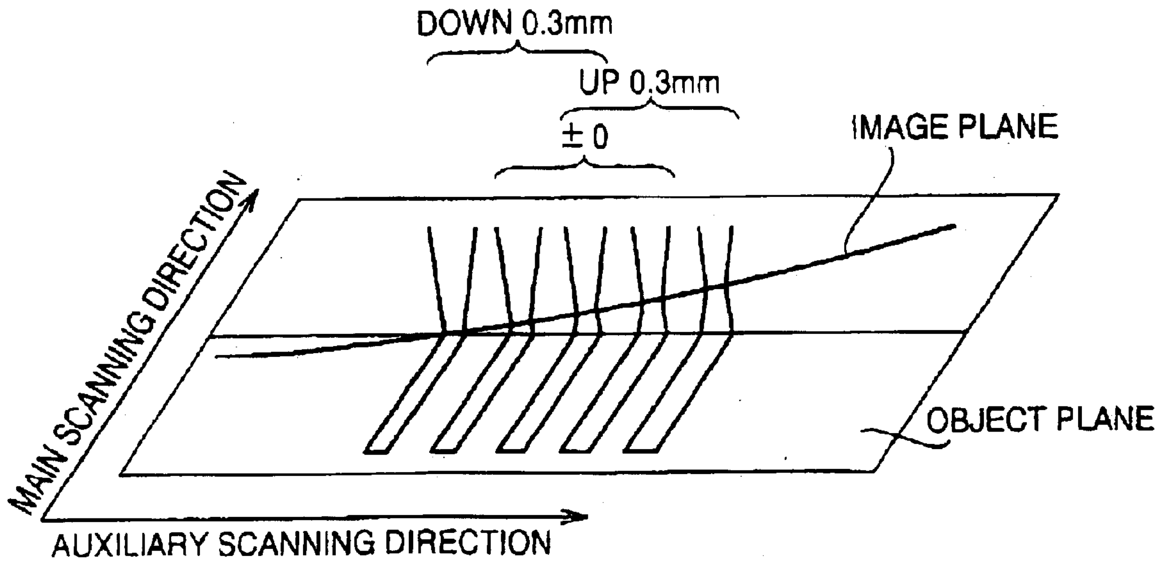
Figure 8:
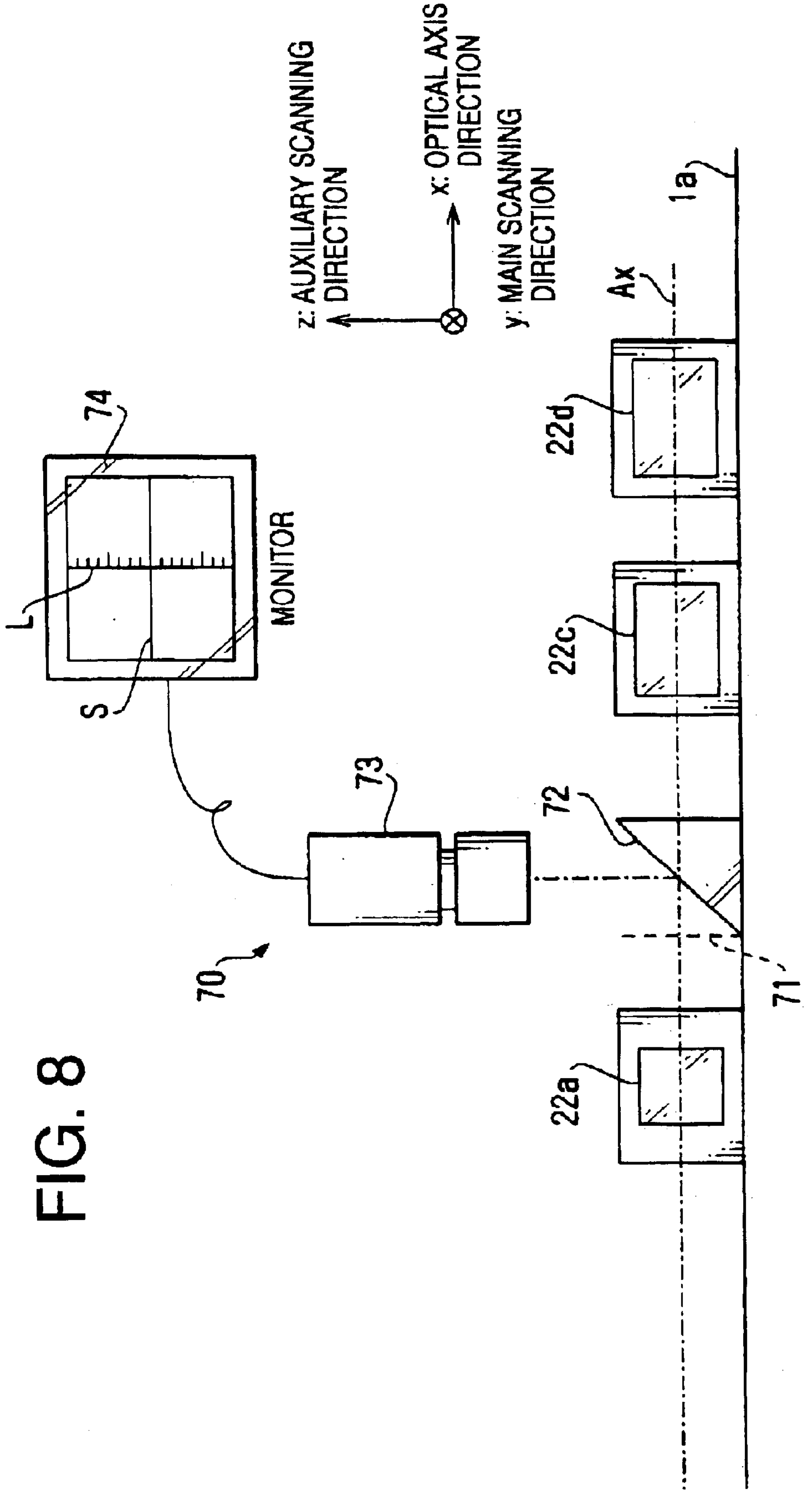

FIGS. 6A and 6B respectively show a front view and a plane view of a lens holder for holding a cylindrical lens group of the multi-beam scanning device shown in FIG. 1;

FIGS. 7A and 7B schematically illustrate laser beams scanned across an object surface by the multi-beam scanning device; and FIG. 8 schematically illustrates a method for adjusting the inclination of a half mirror of the multi-beam scanning device shown in FIG. 1.

DETAILED DESCRIPTION OF THE EMBODIMENTS

Hereinafter, an embodiment of the present invention will be described with reference to the accompanying drawings. The embodiment described is directed to a multi-beam scanning unit 100 that can be utilized for a laser image forming device such as a laser printer, laser copy apparatus, laser facsimile apparatus, a laser photo-plotter, and a direct imager.

General Configuration

Figure 2:
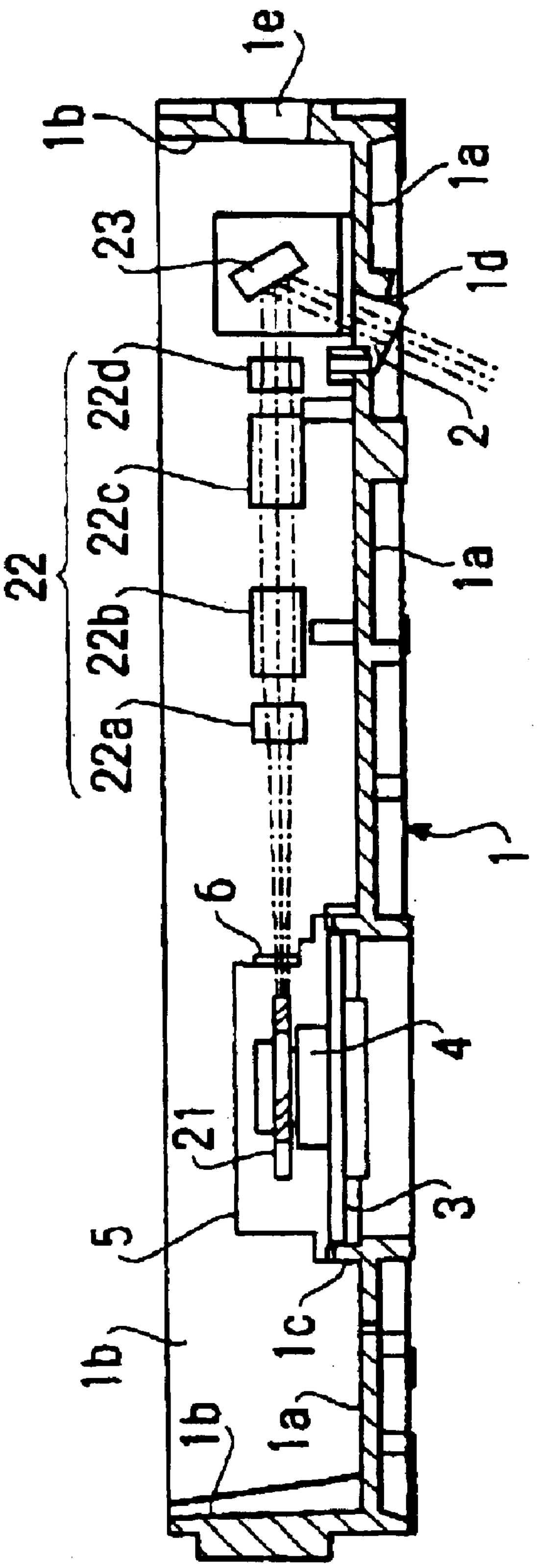
FIG. 2 is a sectional view of the multi-beams scanning device shown in FIG. 1 taken along a line II—II.

FIG. 1 schematically shows a plan view of the multi-beams scanning device 100, FIG. 2 is a sectional view of the multi-beams scanning device 100 shown in FIG. 1 taken along a line II—II.

A casing 1 of the multi-beam scanning device 100 has a thin, substantially rectangular parallelepiped form. The casing 1 is provided with an opening at the top thereof which is to be closed by a not shown lid.

The casing 1 is an aluminum die cast member having a bottom 1*a* and side walls 1*b* formed around the bottom 1*a* to extend uprightly. An optical system 110 that is adapted to scan a plurality of laser beams is accommodated in this casing 1 as will be described later in detail.

The bottom 1*a* of the casing 1 has an upper surface that is substantially flat except at a portion to which a polygon mirror 21 is to be mounted. A beam scanning slit 1*d* is formed to the bottom 1*a* in a vicinity of the side wall 1*b* at the right-hand side in FIG. 1 so as to extend in parallel to this side wall 1*b*. A cover glass 2 is attached to the beam scanning slit 1*d* to prevent dust from coming into the multi-beam scanning device 100. The laser beams of the multi-beam scanning device 100 are directed toward an object, such as a photosensitive drum or a printed circuit board, through the beam scanning slit 1*d*.

An optics adjusting slit le is formed to the side wall 1*b* in parallel to the beam scanning slit 1*d*. The optics adjusting slit 1*e* allows adjustment of the optical system 110 within the casing 1 before shipment of the multi-beam scanning device 100. Note that after the adjustment is carried out, the optics adjusting slit 1*e* will be closed by a not shown plate.

The optical system 110 of the multi-beam scanning device 100 includes, in order along the laser beam traveling direction, a monolithic laser array (MLA) 10, a collimator lens group 11, an anamorphic prism 12, a polarization beam splitter (PBS) 13, a right angle prism 14, a first relay lens group 15, a planar mirror 16, a second relay lens group 17, a half mirror 18, a dynamic prism 19, a cylindrical lens group 20, a polygon mirror (reflection type main deflector) 21, an fθ lens groups 22, and a fold-over mirror 23. The optical system 110 further includes an automatic power control (APC) sensor 24 that detects the light transmitted through the half mirror 18, a right angle reflecting mirror 25 located at a corner of the image side of the fθ lens groups 22, and a start of scan (SOS) unit 26 that receives the laser beam reflected by the right angle reflecting mirror 25.

The polygon mirror 21 is a thin hexagonal prism. Each of the side surfaces of the polygon mirror 21 is formed as a mirror for reflecting and deflecting the laser beams. The polygon mirror 21 is mounted to a driving shaft of a motor 4 that is fixed on a circular substrate 3 at a center thereof. The substrate 3 is fitted into a polygon mirror mounting portion 1*c*. The polygon mirror mounting portion 1*c* is an annual protrusion formed to the bottom 1*a* of the casing 1 at a location displaced from the center of the casing 1 in a direction opposite to the slit 1*d*. The substrate 3 fitted into the polygon mirror mounting portion 1*c* supports the motor 4 such that the driving shaft thereof extends perpendicular to the bottom 1*a* of the casing 1.

A substantially cylindrical cover 5 is attached on the substrate 3 to cover the polygon mirror 21 and the motor 4. An opening is formed to a circumferential wall of the cover 5 to allow the laser beams entering the cover 5 to strike the reflecting surfaces (side surfaces) of the polygon mirror 21 and traveling out from the cover 5 after being reflected by the reflecting surfaces. A cover glass 6 is attached to the opening of the cover 5 for preventing dust entering into the cover 5.

Hereinafter, the direction in which the laser beams reflected by the reflecting surfaces of the polygon mirror 21 are scanned as the polygonal mirror 21 rotates is referred to as a “main scanning direction”, while an “auxiliary scanning direction” is defined as a direction perpendicular to both of the main scanning direction and the optical axis of the fθ lens groups 22.

The MLA 10 is a light source including a plurality of laser diodes integrated into one chip. In the present embodiment, the MLA 10 includes twelve laser diodes arranged such that twelve laser beams are emitted along a common plane at a constant interval of 100 μm. The MLA 10 is mounted on the bottom 1*a* of the casing 1 at a side opposite to the beam scanning slit 1*d* such that the twelve laser beams are emitted in parallel to the beam scanning slit 1*d*.

The collimator lens groups 11 converts the divergent light beams emitted from the MLA 10 into parallel light beams and makes the optical axes of the laser beams intersect to each other at the exit pupil plane thereof. The collimator lens group 11 is designed so as to have small chromatic aberration, be less temperature dependent, and have high resolution even at a large image height. Each of the laser beams passed through such a collimator lens group 11 becomes to have an elliptical cross section. The collimator lens group 11 is held in a lens holder 30 (see FIGS. 3A and 3B). the lens holder 30 supports the collimator lens groups 11 such that the optical axis thereof is parallel with the bottom 1*a* of the casing 1. As will be described later, the lens holder 30 is configured such that the position of the collimator lens group 11 in a direction along the optical axis of the optical system 110 can be adjusted.

The anamorphic prism 12 is a beam forming optical system composed of a pair of wedge prisms 12*a* and 12*b*. The anamorphic prism 12 reduces the width of the laser beam passed therethrough into half in the auxiliary scanning direction.

The PBS 13 is a polarization beam splitter composed of a pair of prisms 13*a* and 13*b*.

The right-angle prism 14 is placed in the casing 1 such that a pair of rectangular reflecting surfaces thereof are extending perpendicularly to the bottom 1*a* of the casing 1. The laser beams passed through the PBS 13 enter the right-angle prism 14, reflected twice within the right-angle prism 14, and then emerge therefrom in the opposite direction. That is, the laser beams are deviated through an angle of 180° within a plane parallel to the bottom 1*a* of the casing 1.

The first and second relay lens groups 15 and 17 forms an afocal optical system. The first relay lens groups 15 converges each laser beam emerging from the exit pupil of the collimator lens group 11 at an image forming position F. The beam axes of the laser beams passed through the first relay lens group 15 are parallel to each other and also to the optical axis of the optical system 110.

The planar mirror 16, disposed in the casing 1 perpendicularly to the bottom 1*a*, deviates the laser beams from the first relay lens groups 15 for an angle of 90° so that the laser beams are directed to the second relay lens groups 17 without interfering with the polygon mirror 21 and the fθ lens group 22.

The second relay lens group 17 converts the diverging laser beams coming from the first relay lens group 15 into parallel light beams, and also inclines the laser beams so that the beam axes thereof intersect on or in a vicinity of the reflecting surfaces of the polygon mirror 21. In other words, the first and second relay lens groups 15 and 17 are arranged so that the exit pupil of the collimator lens group 11 is optically conjugated to the reflecting surfaces of the polygon mirror 21. The second relay lens group 17 is held by a lens holder 40 (see FIGS. 4A, 4B and 4C), which will be described later, so as to be movable along the optical axis of the optical system 110, and such that the optical axis of the second relay lens group 17 extends parallel to the bottom 1*a* of the casing 1.

The half mirror 18 reflects 90 to 95 percent of each of the laser beams passed through the second relay lens group 17 toward the polygon mirror 21, and allows the remaining part to be transmitted therethrough. The half mirror 18 is mounted to a mirror holder 50 (see FIGS. 5A and 5B) screwed onto the bottom 1*a* of the casing 1. The mirror holder 50 will be described later in detail.

The APC sensor 24 includes a collective lens 24*a* for converging the twelve laser beams transmitted through the half mirror 18, and a light receiving element 24*b* onto which the converged laser beams impinge. The light receiving element 24*b* generates electrical current corresponding to the light intensity of each laser beam and provides it to a not shown APC circuitry. The APC circuitry automatically adjusts the intensity of each laser beam emitted from the MLA 10 in accordance with the detection of the light receiving element 24*b*.

The dynamic prism 19 is a wedge prism that is disposed rotatable about an axis parallel to the bottom 1*a* of the casing 1 and perpendicular to the optical axis of the optical system 110. The dynamic prism 19 shifts the laser beams in parallel to control the beam spot positions on the object surface in the auxiliary direction. The dynamic prism 19 corrects changes in the position of beam spots (in the auxiliary scanning direction) on the object surface resulting from uneven moving rate of the object surface. The dynamic prism 19 is rotated by a not shown driving mechanism. Note that the dynamic prism 19, or the wedge prism, can be replaced with a diffraction grating, which may contribute to weight reduction of the multi-beam scanning device.

The cylindrical lens group 20 has a positive power only in the auxiliary scanning direction. The cylindrical lens group 20 converges each of the laser beams emerging from the dynamic prism 19 to form a line parallel to the bottom of the casing on or in the vicinity of the reflecting surfaces of the polygon mirror 21. The cylindrical lens group 20 is held by a lens holder 60, which will be described later with reference to FIGS. 6A and 6B, such that the optical axis of the cylindrical lens group 20 is parallel to the bottom of the casing 1, and also such that the cylindrical lens group 20 can be moved in the optical axis direction of the optical system 110.

The fθ lens group 22 includes first, second, third and fourth lenses 22*a*, 22*b*, 22*c* and 22*d*, arranged in this order from the polygon mirror 21 to the fold-over mirror 23. The first, second, third and fourth lenses 22*a*, 22*b*, 22*c* and 22*d* respectively have, in both of the main and auxiliary scanning directions, negative, positive, positive, and negative power. The laser beams pass through the fθ lens group 22 after being deflected by the polygon mirror 21 rotating at a constant angular velocity. The fθ lens make the laser beams passed therethrough to scan the object surface at a constant speed in the mains scanning direction.

Each of the first, second, third, and fourth lenses 22*a*, 22*b*, 22*c* and 22*d* is supported in a separate lens holder (not shown in FIG. 2) screwed onto the bottom 1*a* of the casing 1. Assuming that the dynamic prism 19 is not shifting the laser beams, and the twelve laser beams is numbered in sequence in the auxiliary direction, the fθ lens group 22 is arranged such that the optical axis thereof extends in the middle of the space between the sixth and seventh laser beams.

The fθ lens group 22 converges each of the laser beams into a small beam spot on the object surface. It should be noted that the power of the whole fθ lens group 22 is designed so as to be relatively small in the main scanning direction while being relatively large in the auxiliary scanning direction. This is because the laser beams entering the fθ lens group 22 are parallel lights in the main scanning direction and divergent lights in the auxiliary scanning direction.

The reflecting surfaces of the polygon mirror 21 is optically conjugated to the object surface through the fθ lens group 22 in the auxiliary scanning direction. Thus, the beam spots formed on the object surface do not shift in the auxiliary scanning direction even if the reflecting surfaces of the polygon mirror 21 have tilting errors (facet errors).

The fold-over mirror 23 is an elongated rectangular planar mirror disposed such that a longitudinal axis thereof is parallel to the beam scanning slit 1*d*. The fold-over mirror 23 is supported at respective ends so as to be rotatable about the longitudinal axis thereof. The inclination of the fold-over mirror 23 is adjusted by rotating it about the longitudinal axis so that the reflected laser beams pass through the beam scanning slit 1*d* and impinges onto the object surface at predetermined exposing positions.

The twelve laser beams reflected by the fold-over mirror 23 forms twelve beam spots on the object surface that are arranged on a line extending in the auxiliary direction at a constant interval of 350 μm, which substantially corresponds to 800 dpi. As the polygon mirror 21 rotates, the beam spots move on the object surface in the main scanning direction to form twelve scanning lines.

The right angle reflecting mirror 25 are located in a vicinity of one end of the fold-over mirror 23 so that the laser beams deflected by the rotating polygon mirror 21 strike the right angle reflecting mirror 25 immediately before being incident on the fold-over mirror 23. The right angle reflecting mirror 25 is composed of a pair of mirrors that oppose to each other to form an angle of 90° therebetween. The right angle reflecting mirror 25 reflects the laser beams first in auxiliary direction, and then toward the SOS unit 26 in parallel with the bottom of the casing 1.

The SOS unit 26 generates a signal when it has received the laser beams. The signal generated by the SOS unit 26 is entered into a not shown modulation circuitry to control the initiation the ON/Off modulation of the laser beams emitted from the MLA 10, or the horizontal synchronization.

Configuration of the Lens Holder for the Collimator Lens Group

Figure 3A:
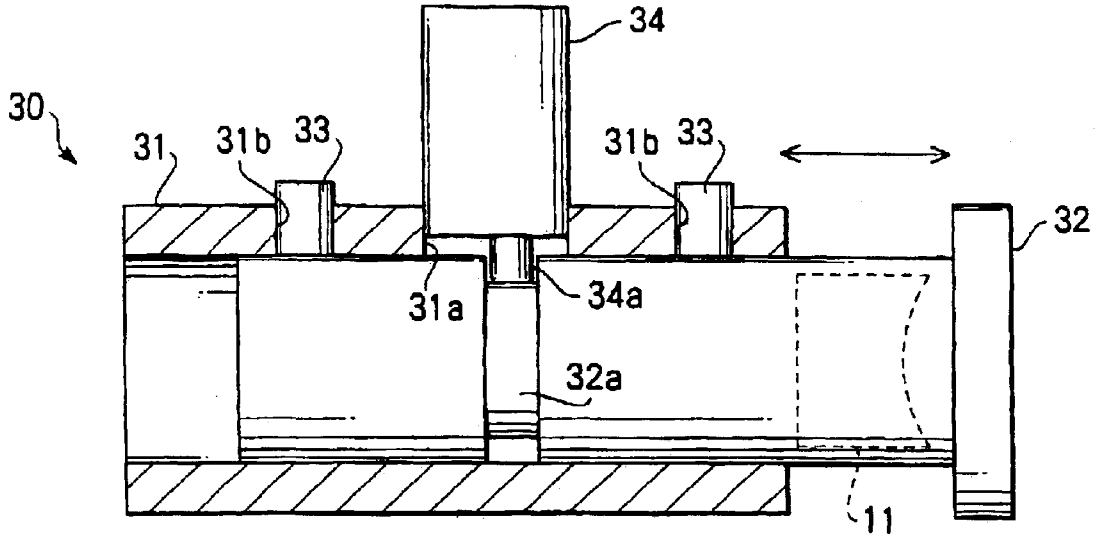
FIGS. 3A and 3B are, respectively, a partially sectional side view and a plane view of a lens holder for holding a collimator lens group of the multi-beam scanning device shown in FIG. 1.
Figure 3B:
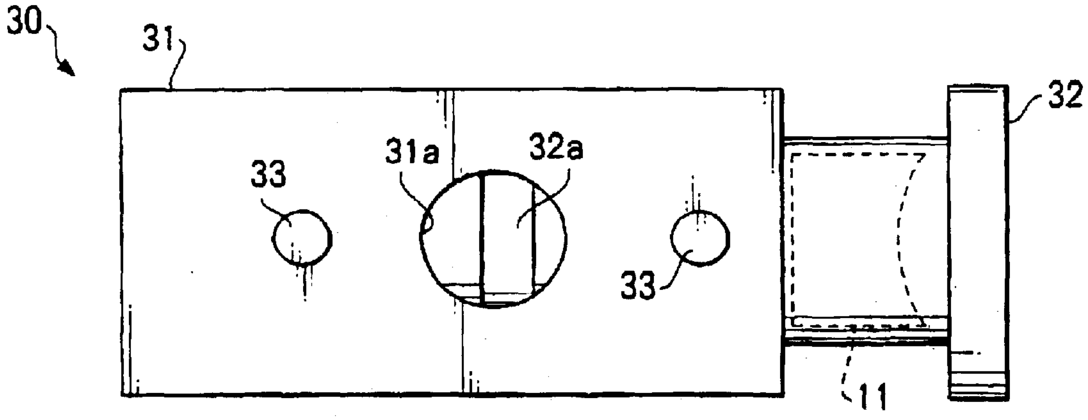

Now, the configuration of the lens holder 30 for holding the collimator lens group 11 will be described with referent to FIGS. 3A and 3B, which are a partially sectional side view and a plane view of the lens holder 30, respectively.

The lens holder 30 has a cylindrical member 31, a lens-barrel, 32, two screws 33, and a knob 34. The cylindrical member 31 is fixed on the bottom of the casing 1. The lens-barrel 32 holds the collimator lens system 11 therein and is slidably inserted In the cylindrical member 31.

Two screw holes 31*b* are formed to the circumferential wall of the cylindrical member 31, spaced apart from each other for a predetermined distance in an axial direction of the cylindrical member 31. The screws 33 are screwed into respective screw holes 31*b* so as to press the side wall of the lens-barrel 32.

A circular through hole 31*a* is formed to the circumferential wall of the lens holder 31 at a middle of the two screw holes. The through hole 31*a* has an inner diameter that is substantially the same as the outer diameter of the knob 34. The knob 34 is rotatably coupled to the cylindrical member 31 by inserting the tip end thereof into the through hole 31*a*.

The knob 34 has a pin 34*a* protruding from the tip end of the knob 34. The pin 34*a* is formed at a location displaced from the rotation axis of the knob 34. The tip end of the pin 34*a* is coupled with a circumferential groove 32*a* of the lens-barrel 32.

In the lens holder 30 arranged as described above, the lens barrel 32 can be moved in the axial direction thereof by loosening the screws 33 and then rotating the knob 34 so that the pin 34*a* pushes the lens-barrel 32 and thereby make the lens-barrel 32 slide back and forth within the cylindrical member 31. In this way, the position of the collimator lens system 11 in the optical axis direction can be easily adjusted. It should be noted, however, that the adjustable range of the position of the collimator lens system 11 is not more than twice the displacement of the pin 34*a* from the rotation axis of the knob 34.

Configuration of the Lens Holder of the Second Relay Lens Group

Next, the lens holder 40 for holding the second relay lens group 17 will be described with reference to FIG. 4A, 4B and 4C, which respectively show a plan view, a front view, and a side view of the lens holder 40.

The lens holder 40 has a lens-barrel 41 holding the second relay lens group 17, an L like shape attachment 42 fixed on the bottom of the, casing 1, an L like shape plate 43 attached to the attachment 42 to press the lens-barrel 41 against the attachment 42, and four screws 44.

The L like shape attachment 42 has a bottom portion 42*a* and a wall portion 42*b* integrally formed to the bottom portion 42*a*. The bottom portion 42*a* is a rectangular flat plate fixed to the bottom of the casing 1 so as to be parallel thereto. The wall portion 42*b* is a rectangular flat plate thicker than the bottom portion 42*a*. The wall portion 42*b* extends uprightly from one side edge of the bottom portion 42*a*. The height of the wall portion 42*b* from the upper surface of the bottom portion 42*a* is substantially the same as the diameter of the lens-barrel 41. The length of the bottom portion 42*a* from the wall portion 42*b* to the opposite side edge is longer than the diameter of the lens-barrel 41.

Two screw holes (not shown) are formed to the bottom portion 42*a* in a vicinity of the side edge opposite to the wall portion 42*b*, and another two screw holes (not shown) are formed on the top surface of the wall portion 42*b*.

The plate 43 is a thin elongated plate bent in the middle portion thereof in the longitudinal direction. One end portion of the plate 43 is fixed on the top surface of the wall portion 42*b* of the attachment 42 by two screws 44. The other end portion of the plate 43 is fixed on the upper surface of the bottom portion 42*a* near the side opposite to the wall portion 42*b* by other two screws 44. Note that the other end portion of the L like shape plate 43 is bent outwardly for an angle of 90 degree.

The plate 43 and the attachment 42 arranged as described above defines a substantially prismatical space therebetween for holding the lens-barrel 41 therein. It should be noted that the materials and the surface conditions of the lens-barrel 41, the attachment 42, and the plate 43 are determined such that proper friction occurs among them that prevents the lens-barrel 41 from sliding off when the screws 44 are tightly coupled to the attachment 42.

In the lens holder 40 arranged as described above, the lens-barrel 41 can be moved in an axial direction thereof by merely loosening the screws 44. Thus, the position of the second relay lens group 17 in the optical axis direction can be easily adjusted.

Configuration of the Mirror Holder of the Half Mirror

Figure 5A:
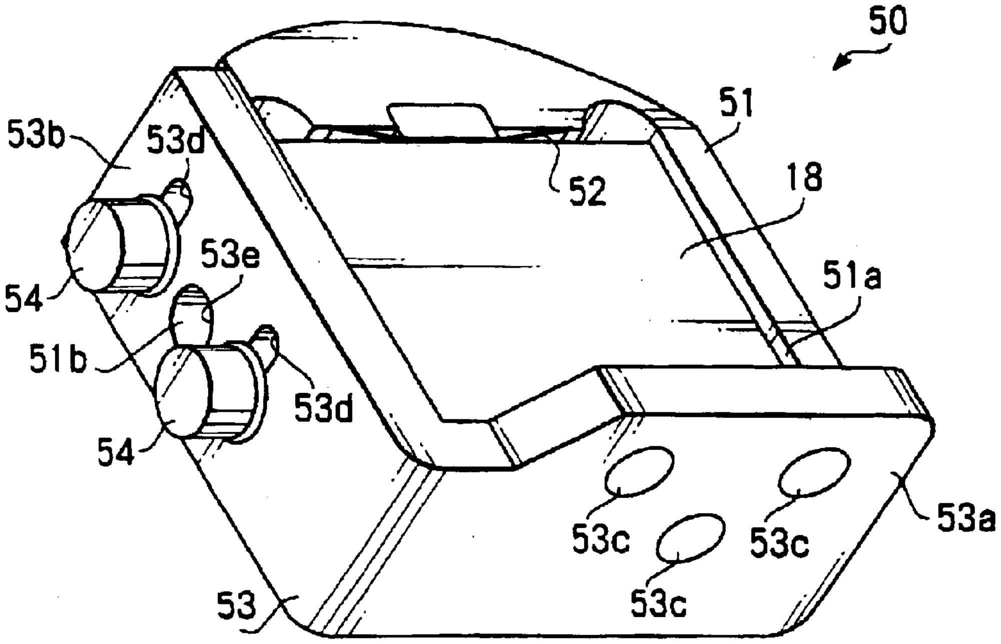
FIGS. 5A and 5B are, respectively, a perspective view and a front view of a mirror holder of the multi-beam scanning device shown in FIG. 1.
Figure 5B:
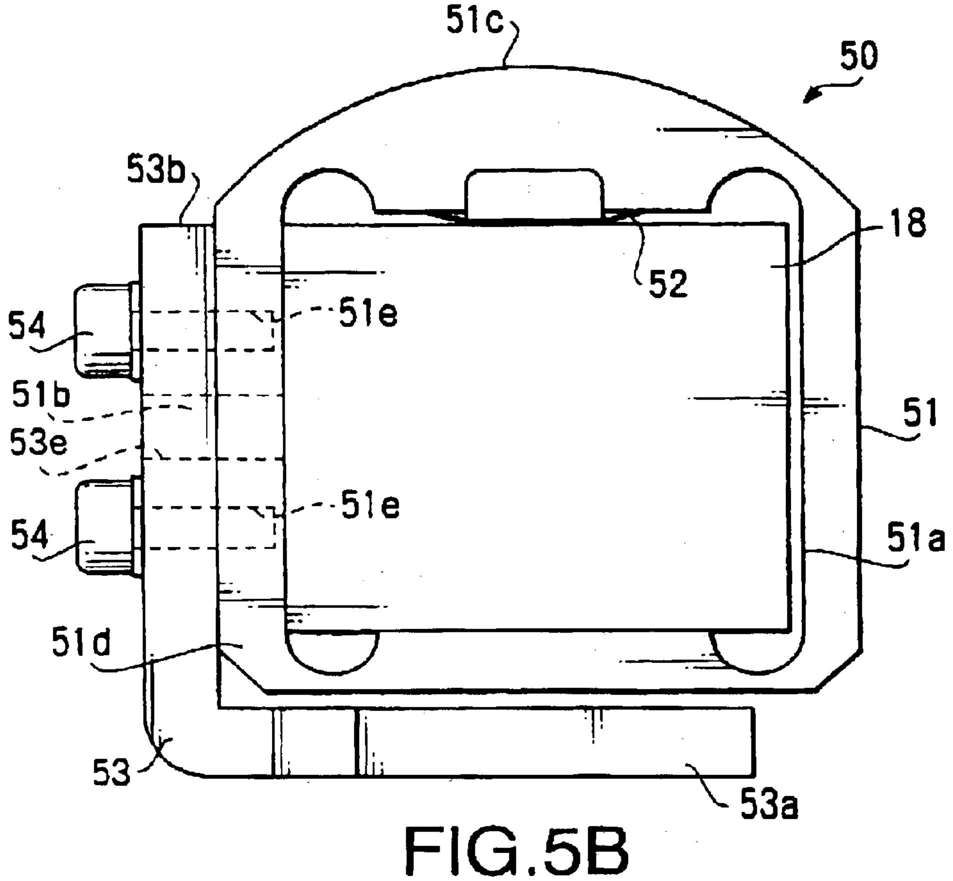

Now, the mirror holder 50 holding the half mirror 18 will be described with reference to FIGS. 5A and 5B, which respectively show a perspective view and a front view of the mirror holder 50.

The mirror holder 50 includes a mirror frame 51 holding the half mirror 18 (which half mirror 18 is a rectangular flat plate), a leaf spring 52 for biasing the half mirror 18 against the mirror frame 51, a supporting member 53 secured on the bottom of the casing 1 and rotatably supporting the mirror frame 51, and two screws 54 for fixing the mirror frame 51 at a certain rotational position.

The mirror frame 51 is a thick flat plate, which has a substantially rectangular shape except that one side thereof (the upper side 51*c* in FIG. 5B) is formed in a convex shape. A substantially rectangular opening 51*a* is formed in the middle of the front surface of the mirror frame 51. The opening 51*a* has a length and width slightly larger than those of the half mirror 18. One of the two sides adjacent to the convex side 51*c* (in this embodiment, the left side 51*d* in FIG. 5B) has an outwardly protruding shaft 51*b* formed in the middle thereof. Further, two screw holes 51*e* are also formed to the left side 51*d* of the mirror frame 51 such that the shaft 51*b* is located therebetween. The screw holes 51*e* are formed from the outside of the mirror frame 51 and do not reach the opening 51*a*.

The leaf spring 52 is a resilient plate which is slightly bent. The leaf spring 52 is placed between the half mirror 18 and one of the inner side walls of the opening 51*a* so as to press the half mirror 18 against the opposite inner side wall of the opening 51*a*. Note that the materials and surface conditions of the opening 51*a* and the half mirror 18 are determined such that proper friction occurs between the half mirror 18 and the inner side walls of the opening 51*a*.

The supporting member 53 is an L like shape member obtained by bending an elongated plate in the middle thereof in the longitudinal direction. The supporting member 53 has a first portion 53*a* and a second portion 53*b* extending perpendicularly to the first portion 53*a*. The first portion 53*a* has three through holes 53*c*. The first portion 53*a* is secured on the bottom of the casing 1 by screws that are inserted through respective ones of the through holes 53*c* and screwed into the bottom of the casing 1. With this, the second portion 53*a* of the supporting member 53 is kept at a posture perpendicular to the bottom of the casing 1. Note that the first portion 53*a* has a larger width than the second portion 53*b* so that the supporting member 53 can be secured stably to the casing 1.

The second portion 53*b* of the supporting member 53 has a through hole 53*e* that pivotably supports the shaft 51*b* of the mirror frame 51. Thus, the mirror frame 51 and hence the half mirror 18 can be inclined against the bottom of the casing 1, or the optical axis of the optical system 110.

The supporting member 53 further has two through holes 53*d* formed to the second portion 53*b* such that the through hole 53*e* is located in the middle thereof. The through holes 53*d* are long in the width direction of the second portion 53*b* as shown in FIG. 5A. Two screws 54 are inserted through the through holes 53*d* and screwed into the screw holes 51*e*.

In the mirror holder 50 arranged as described above, the inclination of the half mirror 18 can be adjusted by loosening the screws 54, and pinching the convex side 51*c* of the mirror frame 51 to rotate the mirror frame 51 about the shaft 51*b*. When the inclination of the half mirror 18 is appropriately adjusted, the screws 54 are tightened again to fix the mirror frame 51 against the second portion 53*b* of the supporting member 53. Note that the maximum inclination of the half mirror 18 is determined by the length of the through holes 53*d*.

Configuration of the Lens Holder of the Cylindrical Lens Group

Next, the lens holder 60 for holding the cylindrical lens group 20 will be described with respect to FIGS. 6A and 6B, which show a front view and a plane view of the lens holder 60, respectively.

Figure 4A:
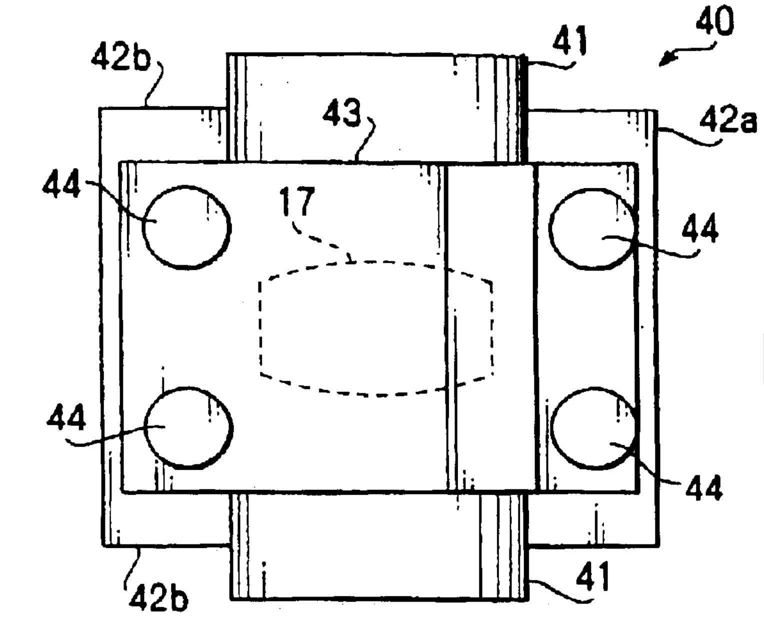
FIGS. 4A, 4B and 4C are, respectively, a plan view, a front view, and a side view of another lens holder for holding a relay lens group of the multi-beam scanning device shown in FIG. 1.
Figure 4B:
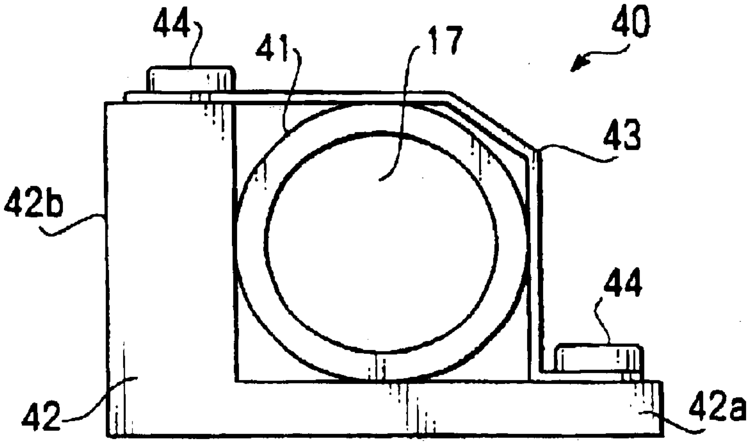
Figure 4C:
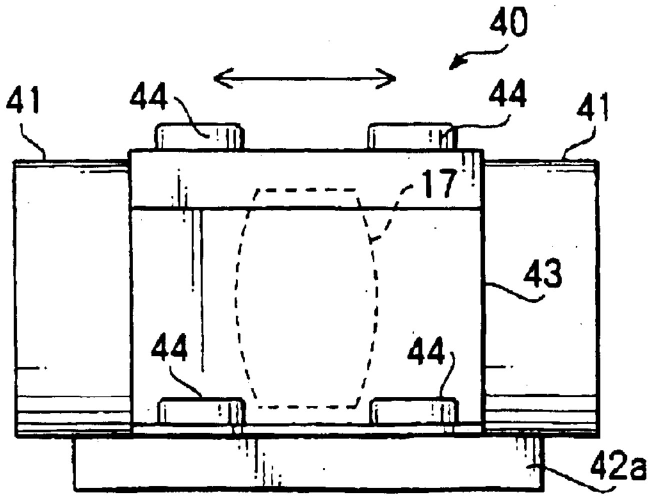

The configuration of the lens holder 60 is similar to that of the lens holder 40 shown in FIGS. 4A, 4B and 4C. That is, the lens holder 60 has a lens barrel 61, an L like shape attachment 62 having a bottom portion 62*a* and a wall portion 62*b*, and an L like shape plate 63 that is attached to the attachment 62 by means of four screws 64 so as to secure the lens-barrel 61 on the attachment 62. The lens holder 60, however, differs from the lens barrel 40 in the following points.

First, the lens-barrel 61 has a flange 61*a* at the front end thereof. The cylindrical lens group 20 is supported by the flange 61*a* instead of being inserted into the lens-barrel 61. More specifically, the flange 61*a* is provided with a rectangular recess (not shown) and the cylindrical lens group 20 is fitted into this rectangular recess and fixed to the flange by means of adhesive.

Second, each side of the bottom portion 62*a* of the attachment 62 is expanded in a direction perpendicular to the wall portion 62*b* (i.e., in the main scanning direction) for a predetermined width. An elongated groove if is formed to the bottom of the casing 1 in parallel with the optical axis of the optical system 110. The groove if has substantially the same (or slightly larger) width (the length in the direction perpendicular to the wall portion 62*b*) as the bottom portion 62*a* of the attachment 62. Further, the groove if has a depth substantially the same (or slightly smaller) as the thickness of the bottom portion 62*a*.

The bottom portion 62*a* of the attachment 62 is placed in the groove if with one side thereof pressed against the side of the groove if (the left side of the groove if in FIGS. 6A and 6B). Two screws 7 are screwed into the bottom of the casing at both sides of the groove if. Each screw 7 is provided with a washer 7*a* that presses down the bottom portion 62*a* of the attachment 62 at the expanded portion thereof to keep the attachment 62 in the groove 1*f*.

The lens holder 60 arranged as described above can be moved in the optical axis direction by merely loosening the screws 7, sliding the attachment 62 along one of the side walls of the groove if, and then tightening the screws 7 again. Thus, the position of the cylindrical lens group 20 in the optical axis direction can be easily adjusted.

Function of the Multi-Beam Scanning Device According to the Embodiment

As described previously, the multi-beam scanning device 100 according to the present embodiment has the facet error correction function. Therefore, the fθ lens 22 has a short focal length in an auxiliary scanning plane (a plane including the optical axis of the optical system 110 and being parallel to the auxiliary scanning direction), resulting in unnegligible field curvature in the auxiliary scanning plane. The beam waist position of the laser beam passed through the fθ lens 22 displaces from the object surface in the optical axis direction due to the field curvature. The displacement of the laser beam waist increases as the distance of the laser beam from the optical axis increases. As a result, the spot formed on the object surface by the laser beam propagating near the optical axis and the spot formed by the laser beam propagating far apart from the optical axis become to have different sizes.

Since the multi-beam scanning device 100 is provided with the dynamic prism 19, which shifts the laser beams in the auxiliary direction in accordance with the uneven moving rate of the object surface in the auxiliary direction, the laser beam located apart from the optical axis may be shifted further away from the optical axis, resulting in further increase of the size of the spot formed on the object surface.

The laser beam shifting range of the dynamic prism 19 is designed such that the maximum size difference among the spots formed on the object surface does not exceed an acceptable range even if the laser beams are fully shifted in the auxiliary scanning direction. Thus, if each optical element is manufactured and placed in the casing 1 exactly as designed, the size differences between the beam spots do not come large and the quality of the image being formed does not deteriorates.

In some cases, one or more optical elements of the optical system 110 decenter in the auxiliary scanning direction due to manufacturing error and/or assembling error. Such decentering causes the image plane to incline against the object surface in the auxiliary scanning plane. In other words, the image plane in the auxiliary scanning plane deviates more from the object surface on one side (first side) of the optical axis than on the other side (second side). As a result, the size difference between the spot formed by the laser beam most apart from the optical axis on the first side and the beam spot formed by the laser beam propagating the paraxial region become much larger than expected. In such case, if the dynamic prism 19 is utilized to shift the laser beams, the maximum size difference between the spots formed on the objective surface can exceed the acceptable value, which cause serious deterioration of the imaging quality.

In the multi-beam scanning device 100 according to the present embodiment, however, the inclination of the image plane in the auxiliary scanning plane caused by the decentering of one or more optical elements of the optical system 110 can be reduced or removed without inspecting each optical components and exchanging it or adjusting the posture thereof, but only adjusting the inclination of the half mirror 18. Thus, the deterioration of imaging quality due to the operation of the dynamic prism 19 can also be reduced to an acceptable level with ease.

In the multi-beam scanning device 100, the laser beam may be converged in the main scanning direction and in the auxiliary direction at different positions in the optical axis direction due to manufacturing error of the optical elements. Conventionally, this positional difference have been corrected by first moving the collimator lens group 11 in the optical axis direction thereof in order to adjust the position at which the laser beam is converged in the main scanning direction, and then adjusting the position at which the laser beam is converged in the auxiliary scanning direction by moving the cylindrical lens group 20 in the optical axis direction thereof.

In the above-mentioned method, however, the laser beam entering the dynamic prism 19 changes, in the auxiliary direction, from a parallel light beam into a converging or diverging light beam as the collimator lens group 11 is moved. This is because the collimator lens group 11 is rotationally symmetrical and has power also in the auxiliary scanning direction.

If the laser beam entering the dynamic prism 19 is not a parallel light in the auxiliary scanning direction, the position at which the laser beam is converged in the auxiliary scanning direction displaces from the object surface in the optical axis direction as the dynamic prism 19 shifts the laser beam in the auxiliary direction. This displacement increases with the distance the dynamic prism 19 shifts the laser beam. Thus, the size of the spot formed on the object surface varies with the operation of the dynamic prism 19, which causes deterioration of imaging quality.

In order to solve the above mentioned problem, the multi-beam scanning device 100 according to the present embodiment is provided with the anamorphic lens group 12 and the first and second relay lens groups 15 and 17. The magnification of the optical system 110 can be changed by moving the collimator lens group 11 and/or the second relay lens group 17. It should be noted, however, that the ratio of the magnification change in the main scanning direction to that in the auxiliary scanning direction differs between when the collimator lens group 11 is moved and when the second relay lens group 17 is moved. This is due to the anamorphic lens 12 disposed between the collimator lens group 11 and the first relay lens group 15, which anamorphic lens 12 changes the laser beam shape by reducing the size thereof in the auxiliary scanning direction while not in the main scanning direction. Accordingly, the magnification of the optical system 110 of the multi-beam scanning device 100 can be changed separately in the main and auxiliary scanning directions, respectively. In other words, it is possible to change the magnification in the main scanning direction while keeping constant the magnification in the auxiliary scanning direction and thereby keeping the laser beam incident on the dynamic prism 19 being a parallel light beam in the auxiliary scanning direction. Thus, in the multi-beam scanning device 100 according to the present invention, the adjustment of the focal points of the laser beam in the main and auxiliary directions can be achieved without deteriorating the image quality due to the use of the dynamic prism 19.

Effect of Inclining the Half Mirror

Hereinafter, the effect of inclining the half mirror 18 will be described

Table 1 shows focal distances of the collimator lens group 11, the second relay lens group 17, and fθ lens group 22.

TABLE 1

| | |
|---|---|
| collimator lens group | 75 mm |
| relay lens group | 200 mm |
| fθ lens group | 329.6 mm |

Table 2 shows specific numerical configuration of the optical system 110 of the multi-beam scanning device 100.

TABLE 2

| NO | Ry | Rz | d | n |
|---|---|---|---|---|
| 1 | ∞ | ∞ | 87.8 | — |
| 2 | −488.1 | — | 12.7 | 1.636 |
| 3 | ∞ | 95.3 | 11.0 | — |
| 4 | 925.2 | — | 30.4 | 1.688 |
| 5 | −211.6 | −48.6 | 28.0 | — |
| 6 | −800 | — | 31.0 | 1.613 |
| 7 | −175.5 | — | 9.6 | — |
| 8 | −163.1 | — | 10.0 | 1.825 |
| 9 | −334.8 | — | 283.3 | — |

(dimension: mm)

In table 2, the leftmost column indicates the surface numbers of the lenses listed sequentially from the polygonal mirror 21 toward the object surface. "Ry" denotes the radius of curvature of lens surfaces in the main scanning direction, "Rz" the radius of curvature of lens surfaces in the auxiliary scanning direction, and "d" the distance to the next lens surface along the optical axis, all indicated in millimeter. "n" denotes the refractive index of a light of which wavelength is 780 nm.

Table 3 shows data on the displacement in the optical axis direction of the beam waist formed in the auxiliary scanning direction when all optical elements are manufactured and assembled exactly as designed. Note that the displacements are indicated in millimeters. Also note that the interval between the laser beams on the image plane is 350 μm.

TABLE 3

| | lowermost beam | middle beam | uppermost beam |
|---|---|---|---|
| 0.3 mm up | −0.194 | −0.063 | −0.305 |
| no shift | −0.221 | 0.005 | −0.137 |
| 0.3 mm down | −0.351 | −0.030 | −0.071 |
| up-down difference | 0.157 | −0.033 | −0.234 |
| maximum difference | 0.157 | 0.068 | 0.234 |

(dimension: mm)

In table 3, the rightmost column indicates the beam waist displacements of the uppermost laser beam (the laser beam most apart from the bottom of the casing 1), while the second column from the right shows the beam waist displacements of the lowermost laser beam. The third column from the right shows data corresponding to a virtual laser beam extending between the sixth and seventh laser beams from the uppermost laser beam. Further, the second row shows the beam waist displacements when the dynamic prism 19 has shifted up (in a direction opposite to the bottom of the casing 1) the laser beams in the auxiliary direction for 0.3 mm. The data on the third row is obtained from the laser beams not shifted by the dynamic prism 19, and on fourth row from the laser beams shifted downward for 0.3 mm in the auxiliary direction. Note that 0.3 mm is the maximum length that the dynamic prism 19 can shift the laser beam in the auxiliary direction.

The data on the fifth row, or "up-down difference", indicate the difference between the values respectively shown on the second and fourth rows of the corresponding column. That is, the difference between the beam waist displacements that occur when the laser beam is shifted 0.3 mm up and down, respectively, by the dynamic prism 19. The data of the sixth row are the maximum difference among the displacements shown in the second, third and fourth rows of the same column. Note that all values are indicated in millimeter.

As shown in Table 3, if all optical elements are manufactured and assembled exactly as designed, the value of the up-down difference does not differ much between the uppermost and lowermost laser beams. This indicates that the image plane is not inclined against the object surface in the auxiliary scanning plane.

Further, it should be noted that the maximum difference is less than 0.25 mm for both the uppermost and lowermost laser beams. This indicates that the spot size on the object surface does not change significantly, and hence deterioration of the imaging quality does not occur, even if the dynamic prism 19 is used.

FIG. 7A schematically illustrates the laser beams being scanned across the object surface by the multi-beam scanning device 100 in which all optical components are manufactured and assembled exactly as designed. In this case, the beam spots respectively formed by the uppermost, middle, and lowermost laser beams, and hence the scanning lines formed by those laser beams, have substantially the same size.

(Manufacturing Error)

Table 4 shows another data on the displacement in the optical axis direction of the beam waist formed in the auxiliary scanning direction. In this case, all optical elements are manufactured and assembled exactly as designed except the rear surface of the second lens 22*b* of the fθ lens group 22 (surface number 5). The rear surface of the second lens 22*b* has a decentering of 0.2 mm in the upward direction due to a manufacturing error. Note that all values are indicated in millimeter.

TABLE 4

| | lowermost beam | middle beam | uppermost beam |
|---|---|---|---|
| 0.3 mm up | −0.267 | −0.260 | −0.628 |
| no shift | 0.181 | −0.079 | −0.347 |
| 0.3 mm down | −0.196 | 0.002 | −0.166 |
| up-down difference | −0.071 | −0.262 | −0.462 |
| maximum difference | 0.086 | 0.262 | 0.462 |

(dimension: mm)

FIG. 7B schematically illustrates the laser beams being scanned across the object surface by the multi-beam scanning device 100 in which the rear surface of the second lens 22*b* of the fθ lens 22 has the above mentioned decentering. As shown in FIG. 7B, the image plane in the auxiliary scanning plane inclines against the object surface. This inclination of the image plane causes, as shown in Table 4, the difference between the up-down difference of the uppermost beam and the up-down difference of the lowermost beam to be larger than that of Table 3.

Further, up-down difference and maximum difference of the uppermost beam is quite large, more than 0.45 mm. This indicates that the size of the spot formed on the object surface changes significantly if the dynamic prism 19 is used. Thus, the imaging quality deteriorates when the dynamic prism 19 is used.

In the multi-beam scanning device 100 according to the present invention, the inclination of the image plane against the object surface in the auxiliary scanning plane can be corrected by appropriately inclining the half mirror 18. In the present case, the half mirror 18 is inclined so that the laser beams are reflected slightly upward to make an angle of 4 minute with a plane parallel to the bottom of the casing 1. Table 5 shows data on the displacement of the beam waist in the optical axis direction from the object surface when the half mirror 18 is inclined as above. Note that the values in Table 5 are indicated in millimeters.

TABLE 5

| | lowermost beam | middle beam | uppermost beam |
|---|---|---|---|
| 0.3 mm up | −0.184 | −0.028 | −0.248 |
| no shift | −0.250 | −0.001 | −0.120 |
| 0.3 mm down | −0.418 | −0.074 | −0.092 |
| up-down difference | 0.234 | 0.046 | −0.156 |
| maximum difference | 0.234 | 0.073 | 0.156 |

(dimension: mm)

As shown in table 5, the difference between the up-down difference of the uppermost beam and the up-down difference of the lowermost beam is at the same level as that of Table 3. The up-down difference and the maximum difference of each laser beam are reduced to small values, less than 0.25 mm. This indicates that the displacement of the beam waist, and hence the size of the spot formed on the object surface, does not change significantly even if the dynamic prism 19 shifts the laser beam. In other words, the inclination of the image plane against the object surface, which is caused by the decentering of the rear surface of the second lens 22*b*, is corrected by appropriately inclining the half mirror 18. As a result, the imaging quality of the multi-beam scanning device 100 does not significantly deteriorate due to the use of the dynamic prism 19.

(Assembling Error)

The deterioration of the imaging quality due to the inclination of the image plane against the object surface may also be caused by assembling error of the optical elements. Table 6 shows data on the displacement of the beam waist from the object surface in the optical axis direction in a case the multi-beam scanning device 100 is assembled such that only the cylindrical lens group 20 is decentered upwardly for 0.2 mm.

TABLE 6

| | lowermost beam | middle beam | uppermost beam |
|---|---|---|---|
| 0.3 mm up | −0.282 | −0.015 | −0.117 |
| no shift | −0.462 | −0.100 | −0.102 |
| 0.3 mm down | −0.746 | −0.290 | −0.192 |
| up-down difference | 0.464 | 0.275 | 0.075 |
| maximum difference | 0.464 | 0.275 | 0.090 |

(dimension: mm)

As shown in Table 6, the difference between the up-down difference of the uppermost beam and the up-down difference of the lowermost beam is larger than that of Table 3 due to the inclination of image plane caused by the decentering of the cylindrical lens group 20. Further, each of the up-down difference and the maximum difference of the lowermost beam increases to a value more than 0.45 mm. That is, the size of the spot formed by the lowermost beam changes significantly as it is shifted by the dynamic prism 19, which causes deterioration of the imaging quality.

Again, the inclination of the image plane causing the large up-down and maximum differences can be corrected by appropriately inclining the half mirror 18. In this case, the half mirror 18 is inclined such that the laser beam is reflected slightly downward to make an angle of 4 minute with a plane parallel to the bottom of the casing 1. Table 7 shows data on the displacement of the beam waist from the object surface when the half mirror 18 is inclined as above.

TABLE 7

| | lowermost beam | middle beam | uppermost beam |
|---|---|---|---|
| 0.3 mm up | −0.196 | −0.076 | −0.327 |
| no shift | −0.222 | −0.007 | −0.159 |
| 0.3 mm down | −0.354 | −0.044 | −0.094 |
| up-down difference | 0.158 | −0.032 | −0.233 |
| maximum difference | 0.158 | 0.069 | 0.233 |

(dimension: mm)

As shown in Table 7, the difference between the up-down difference of the uppermost beam and the up-down difference of the lowermost beam is now at the same level as that of Table 3. The up-down difference and the maximum difference of both the lowermost and uppermost beams are less than 0.25 mm. This indicates that the inclination of the image plane due to the decentering of the cylindrical lens group 20 is corrected by the half mirror 18 so that the imaging quality of the multi-beam scanning device 100 does not deteriorate significantly due to the operation of the dynamic prism 19.

It should be noted that, in the present embodiment, the inclination of the half mirror 18 is adjusted as follows. First, an ideal multi-beam scanning device having no manufacturing error and assembling error is prepared. Then, data on the displacement of the beam waist from the object surface in the ideal multi-beam scanning device is measured for several different inclinations of the half mirror 18. Table 8 shows exemplary data on the beam waist displacement obtained from the ideal multi-beam scanning device. The data shown in Table 8 is obtained by inclining the half mirror 18 upward for an angle of 6 minute.

TABLE 8

| | lowermost beam | middle beam | uppermost beam |
|---|---|---|---|
| 0.3 mm up | −0.410 | −0.055 | −0.070 |
| no shift | −0.661 | −0.213 | −0.128 |
| 0.3 mm down | −1.015 | −0.473 | −0.288 |
| up-down difference | 0.605 | 0.418 | 0.218 |
| maximum difference | 0.605 | 0.418 | 0.218 |

(dimension: mm)

Next, the displacement of the beam waist of each of the laser beams of the multi-beam scanning device 100, of which half mirror 18 is not properly inclined, is measured by means of conventional measuring apparatus. Then, proper inclination of the half mirror 18 is decided based on measurement and the data obtained from the ideal multi-beam scanning device 100.

FIG. 8 schematically illustrates a method for adjusting the inclination of the half mirror 18. The inclination of the half mirror 18 is adjusted by utilizing an adjustment amount detecting device 70. The adjustment amount detecting device 70 includes scale screen 71, a mirror 72, a camera 73, and a monitor 74.

As shown in FIG. 8, when the inclination of the half mirror 18 is to be adjusted, the second lens 22*b* of the fθ lens group 22 is removed together with the lens holder thereof and the scale screen 71 and the mirror 72 are placed between the first and third lenses 22*a* and 22*c*.

The scale screen 71 is ground glass having a graduated line L. The scale screen 71 is attached on the bottom of the casing 1 so that the line L is parallel with the auxiliary scanning direction and also intersects the optical axis of the fθ lens group 22.

The mirror 72 is attached on the bottom of the casing 1 so that the reflecting surface thereof inclines against the scale screen 71 for an angle of 45 degree. The mirror 72 reflects the light passed through the scale screen 71 towards the camera 73. The camera 73 captures an image of the scale screen 71 through the mirror 72 and sends the image to the monitor 74.

As the polygonal mirror 21 rotates, the laser beams deflected by the polygonal mirror 21 form linear trajectories, or scanning lines, on the scale screen 71. These scanning lines are displayed on the monitor 74 along with the graduated line L. If the inclination of the half mirror 18 is changed by operating the mirror holder 50, the scanning lines on the monitor 74 moves up and down. Thus, the inclination of the half mirror 18 can be determined from the position of the scanning lines on the monitor 74.

Effect of Moving the Collimator Lens Group and the Second Relay Group

Hereinafter, the effect of moving the collimator lens group 11 and the second relay lens group 17 will be described.

Assume that the radius of curvature in the main scanning direction, Ry, of the rear surface of the second lens 22*b* (surface number 5) is 200.9 mm instead of 211.6 mm due to manufacturing error. This manufacturing error changes the focal distance of the fθ lens group 22 in the main scanning direction from 329.6 mm to 325.2 mm. In other words, the position at which the laser beam is converged in the main scanning direction shifts in the optical axis direction while the position at which the laser beam is converged in the auxiliary scanning direction does not change.

Conventionally, the above mentioned displacement of the laser beam converging position in the main scanning direction is removed by moving the collimator lens group 11 toward the MLA 10, while also moving the cylindrical lens group 20 toward the polygon mirror 21 in order to keep the laser beam converging position in the auxiliary scanning direction unchanged. In the present case, for example, the collimator lens group 11 should be moved 0.25 mm toward the MLA 10, and the cylindrical lens group 20 2.47 mm toward the polygon mirror 21. Table 9 shows data on the displacement of the beam waist from the object surface in the optical scanning direction when the lens groups are moved as described above.

TABLE 9

| | lowermost beam | middle beam | uppermost beam |
|---|---|---|---|
| 0.3 mm up | −0.055 | 0.086 | −0.166 |
| no shift | −0.247 | −0.015 | −0.169 |
| 0.3 mm down | −0.530 | −0.205 | −0.260 |
| up-down difference | 0.475 | 0.291 | 0.094 |
| maximum difference | 0.475 | 0.291 | 0.094 |

(dimension: mm)

If the collimator lens group 11 is moved toward or away from the MLA 10, the laser beam entering the dynamic prism 19 becomes either a converging light or a diverging light in the auxiliary scanning plane. In such a state, the image plane displaces from the object surface in the optical axis direction if the dynamic prism 19 is operated. As can be understood by comparing the data of 0.3 mm up and 0.3 mm down in Table 9, the image plane displaces more when the dynamic prism 19 is operated so as to shift the laser beam downward. In particular, the beam waist position of the lowermost laser beam displaces for a large distance when it is shifted downward by the dynamic prism 19. Such large displacement of the beam waist in the optical axis direction causes a significant size change of the spot formed on the object surface, which results in significant deterioration of the imaging quality.

In order to avoid the above mentioned deterioration of the imaging quality, the beam converging position in the main scanning plane is corrected, in the present embodiment, by moving the collimator lens group 11 toward the anamorphic prism 12 for 0.084 mm, and the second relay lens group 17 toward the polygon mirror 21 for 2.33 mm. The cylindrical lens group 20 is kept at the initial position.

Table 10 shows data on the displacement of the beam waist from the object surface in the optical axis direction after the collimator lens group 11 and the second relay lens group 17 is moved as above.

TABLE 10

| | lowermost beam | middle beam | uppermost beam |
|---|---|---|---|
| 0.3 mm up | −0.187 | −0.057 | −0.295 |
| no shift | −0.213 | 0.011 | −0.128 |
| 0.3 mm down | −0.343 | −0.024 | −0.064 |
| up-down difference | 0.156 | −0.033 | −0.231 |
| maximum difference | 0.156 | 0.068 | 0.231 |

(dimension: mm)

If the collimator lens group 11 and the second relay lens group 17 are moved as described above, the laser beam entering the dynamic prism 19 remains to be a parallel light in the auxiliary scanning plane. Thus, the image plane does not significantly shift in the optical axis direction even if the dynamic prism 19 is operated, and hence the imaging quality does not deteriorate. It should be noted that the data of table 10 is quite similar to that of table 3 that is obtained for the multi-beam scanning device 100 in which all optical elements are manufactured and assemble exactly as designed.

The distances that the collimator lens group 11 and the second relay lens group 17 should be moved can be determined from the following equation, $$\begin{pmatrix} A & C \\ B & D \end{pmatrix} \begin{pmatrix} X \\ Y \end{pmatrix} = \begin{pmatrix} \alpha \\ 0 \end{pmatrix} \tag{1}$$

where α is the displacement of the beam converging position in the main scanning direction from that in the auxiliary scanning direction. X and Y are the distances for which the collimator lens group 11 and the second relay lens group 17, respectively, should be moved. A and B are the distances for which the beam converging positions in the main and auxiliary scanning directions, respectively, move as the collimator lens groups 11 is shifted in the optical axis direction for a unit distance. C and D are the distances for which the beam converging positions in the main and auxiliary scanning distances, respectively, move as the second relay lens group 17 is shifted in the optical axis direction for a unit distance.

Note that the value of α may be determined by measuring the beam converging positions in main and auxiliary scanning directions, respectively, by means of conventional measuring apparatus.

While the invention has been described with particular reference to its preferred embodiments, it will be understood by those skilled in the art that various changes may be made and equivalents may be substituted for elements of the preferred embodiments without departing from the invention. In addition, many modifications may be made to adapt a particular situation and material to a teaching of the present invention without departing from the essential teachings of the invention. For example, the first relay lens group 15 may be provided to the casing 1 movably in the optical axis direction instead of or in addition to providing the second relay lens group 17 movably to the casing 1.

The present disclosure relates to the subject matter contained in Japanese Patent Application No. P2002-172414, filed on June 13, 2002, which is expressly incorporated herein by reference in its entirety.

What is claimed is:

1. A multi-beam scanning device, comprising:

a light source having a plurality of light emitting elements arranged in a line to emit a plurality of laser beams;

a main deflector having a reflecting surface, said reflecting surface deflecting the laser beams so that the laser beams scan across an object surface in a main scanning direction, said object surface being moved in an auxiliary scanning direction perpendicular to the main scanning direction;

an image forming optical system disposed between said main deflector and the object surface so that said reflecting surface of said main deflector is optically conjugated to the object surface in the auxiliary scanning direction;

a cylindrical lens group disposed between said light source and said main deflector, said cylindrical lens group converging, in the auxiliary scanning direction, each of the laser beams in a vicinity of said reflecting surface of said main deflector;

a deflecting element disposed between said light source and said cylindrical lens group, said deflecting element deflecting the laser beams in the auxiliary scanning direction; and a deflecting element supporting mechanism movably supporting said deflecting element so as to allow adjustment of the traveling direction of the laser beams deflected by said deflecting element.

2. The multi-beam scanning device according to claim 1, further comprising an additional deflector disposed between said deflecting element and said cylindrical lens group, said additional deflector moving the laser beams in parallel in the auxiliary scanning direction in accordance with a moving speed variation of the object surface in the auxiliary scanning direction.

3. The multi-beam scanning device according to claim 1, wherein said deflecting element is a mirror.

4. The multi-beam scanning device according to claim 3, wherein said mirror is a half mirror that allows a part of each laser beam passing therethrough.

5. The multi-beam scanning device according to claim 4, further comprising an optical sensor, said optical sensor detecting light intensity of each of the laser beams passed through said half mirror.

6. The multi-beam scanning device according to claim 1, wherein said main deflector is a polygon mirror.

7. A beam scanning device for scanning a light beam across an object surface, comprising:

a light source that emits a light beam; and an optical system arranged between said light source and an object surface to converge the light beam in a vicinity of said object surface, said optical system including:

a main deflector that deflects the light beam so that the light beam scans the object surface in a main scanning direction while the object surface is moved in an auxiliary scanning direction, the auxiliary scanning direction being perpendicular to the main scanning direction;

an additional deflector disposed between said light source and said main deflector, said additional deflector shifting the light beam in parallel in the auxiliary direction in accordance with a moving speed variation of the object surface, and first and second lenses disposed between said light source and said additional deflector movably in an optical axis direction of said optical system to adjust first and second beam converging positions at which said light beam is converged by said optical system in the main and auxiliary scanning directions, respectively, the ratio between moving distances of the first and second beam converging positions caused by a movement of said first lens being different from that caused by a movement of said second lens.

8. The beam scanning device according to claim 7, wherein said first and second lens are rotationally symmetrical lenses, and wherein said optical system further includes an anamorphic optical element disposed between said first and second lenses, said anamorphic optical element deforming the shape of the laser beam passed therethrough only in the auxiliary scanning direction.

9. The beam scanning-device according to claim 8, wherein said first lens is a collimator lens disposed between said light source and said anamorphic optical element, said first lens converting the laser beam emitted from said light source into a parallel light, and wherein said second lens is one lens of a relay lens system disposed between said anamorphic optical element and said additional deflector.

10. The beam scanning device according to claim 9, wherein said anamorphic optical element is an anamorphic prism.

11. The beam scanning device according to claim 7, wherein said first and second lenses are respectively moved for distances X and Y to adjust said first and second beam converging positions, said distances X and Y are determined from the following equation, $$\begin{pmatrix} A & C \\ B & D \end{pmatrix} \begin{pmatrix} X \\ Y \end{pmatrix} = \begin{pmatrix} \alpha \\ 0 \end{pmatrix} \quad (1)$$

where $\alpha$ represents a distance between said first and second beam converging positions in said optical axis direction before said first and second lenses are moved, A and B respectively representing the displacements of said first and second beam converging positions caused by a movement of said first lens for a unit distance, C and D respectively representing the displacements of said first and second beam converging positions caused by movement of said second lens for a unit distance.

* * * * *